(12) United States Patent
Hirman et al.

(10) Patent No.: US 10,428,471 B1
(45) Date of Patent: Oct. 1, 2019

(54) SYSTEMS AND METHODS FOR CONTROLLING COLD PLANER MATERIAL FLOW

(71) Applicant: Caterpillar Paving Products Inc., Brooklyn Park, MN (US)

(72) Inventors: Colton Hirman, Maple Grove, MN (US); Eric S. Engelmann, Delano, MN (US); Nicholas J. Argenziano, Otsego, MN (US); Timothy M. O'Donnell, Long Lake, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 15/985,781

(22) Filed: May 22, 2018

(51) Int. Cl.
| | | |
|---|---|---|
| *E01C 19/08* | (2006.01) | |
| *E01C 19/10* | (2006.01) | |
| *E01C 19/20* | (2006.01) | |
| *E01C 23/12* | (2006.01) | |
| *E01C 23/088* | (2006.01) | |

(52) U.S. Cl.
CPC ...... *E01C 19/1063* (2013.01); *E01C 19/2045* (2013.01); *E01C 23/088* (2013.01); *E01C 23/127* (2013.01); *E01C 19/08* (2013.01); *E01C 2019/2075* (2013.01)

(58) Field of Classification Search
CPC .. E01C 19/08; E01C 19/1063; E01C 19/2045; E01C 23/088; E01C 23/127; E01C 2019/2075
USPC .......................................... 404/72, 84.05, 94
See application file for complete search history.

(56) References Cited

U.S. PATENT DOCUMENTS

| | | | |
|---|---|---|---|
| 3,684,073 A | 8/1972 | Giles | |
| 3,946,506 A | 3/1976 | Snow, Jr. et al. | |
| 4,139,318 A * | 2/1979 | Jakob | E01C 23/088 |
| | | | 172/118 |
| 4,678,076 A | 7/1987 | Nenakhov et al. | |
| 4,711,357 A | 12/1987 | Langenbeck et al. | |
| 5,201,127 A | 4/1993 | Whitaker, Jr. | |
| 5,452,786 A | 9/1995 | Gilmore | |
| 5,959,257 A | 9/1999 | Campbell et al. | |
| 7,124,876 B2 | 10/2006 | Wolf | |
| 8,480,331 B2 | 7/2013 | Schmidt et al. | |
| 9,045,871 B2 | 6/2015 | Graham et al. | |
| 9,464,391 B2 | 10/2016 | Killion et al. | |
| 9,643,789 B2 | 5/2017 | Teichrob et al. | |
| 9,764,910 B2 | 9/2017 | Berning et al. | |

(Continued)

*Primary Examiner* — Raymond W Addie
(74) *Attorney, Agent, or Firm* — Schwegman, Lundberg & Woessner (57) ABSTRACT

An example cold planer system includes a machine frame, a milling drum, a first conveyor, a second conveyor, a swivel sensor and a control module. The milling drum is rotatably coupled to the machine frame. The first conveyor is configured to convey a milled material away from the milling drum. The second conveyor is configured to convey the milled material from the first conveyor to a discharge location and the second conveyor is pivotably connected to the machine frame. The swivel sensor is configured to generate swivel data corresponding to a swivel position of the second conveyor. The control module is in electrical communication with the swivel sensor, and the control module is configured to receive the swivel data and to control motion of the second conveyor based on the swivel data.

20 Claims, 7 Drawing Sheets

(56) References Cited

U.S. PATENT DOCUMENTS

2009/0317187 A1\* 12/2009 Bohme .............. B60H 1/00378
404/90
2017/0009408 A1 1/2017 Marsolek et al.

\* cited by examiner

SYSTEMS AND METHODS FOR CONTROLLING COLD PLANER MATERIAL FLOW

TECHNICAL FIELD

This document pertains generally, but not by way of limitation, to cold planers, and more particularly, to operating conveyor systems for discharging milled material from a cold planer.

BACKGROUND

Asphalt-surfaced roadways are built to facilitate vehicular travel. Depending upon usage density, base conditions, temperature variation, moisture variation, and/or physical age, the surface of the roadways eventually become misshapen, non-planar, unable to support wheel loads, or otherwise unsuitable for vehicular traffic. In order to rehabilitate the roadways for continued vehicular use, spent asphalt is removed in preparation for resurfacing.

Cold planers, sometimes also referred to as road mills or scarifiers, are machines that typically include a frame propelled by tracked drive units. The frame supports an engine, an operator's station, and a milling drum. The milling drum, fitted with cutting tools, is rotated through a suitable interface by the engine to break up the surface of the roadway. The broken-up roadway material is deposited by the milling drum onto a lower or first conveyor for removal from the underside of the machine. The material is then transferred from the first conveyor onto an upper or second conveyor, which transports the material away from the machine and over a nearby haul vehicle. The material travels up the second conveyor and falls off the end into the haul vehicle for transportation away from the jobsite.

SUMMARY

Illustrative cold planer systems and methods including conveyor operation for milled material transfer, are described herein.

In an example cold planer system, the cold planer includes a machine frame, a milling drum, a first conveyor, a second conveyor, a swivel sensor and a control module. The milling drum is rotatably coupled to the machine frame. The first conveyor is configured to convey a milled material away from the milling drum. The second conveyor, pivotably connected to the machine frame, is configured to convey the milled material from the first conveyor to a discharge location. The swivel sensor is configured to generate swivel data corresponding to a swivel position of the second conveyor. The control module is in electrical communication with the swivel sensor and is configured to receive the swivel data and to control motion of the second conveyor based on the swivel data.

In another example cold planer, the cold planer includes a machine frame, a milling drum, a first conveyor, a second conveyor, a deflector and a deflector actuator to move the deflector. The milling drum is rotatably coupled to the machine frame. The first conveyor is configured to convey a milled material away from the milling drum. The deflector, including a deflector surface, is configured to deflect at least a portion of the milled material exiting the first conveyor towards an input end of the second conveyor. The deflector is movably coupled to the machine frame by the deflector actuator. The second conveyor is pivotally connected to the machine frame by a swivel actuator and is configured to convey the milled material from the first conveyor to a discharge location. The cold planer can also include a position sensor and a control module. The position sensor is configured to generate position data that is an indicator of a flow path of the milled material. The control module is in electrical communication with the position sensor and the deflector actuator. To control material flow, the control module is configured to receive the position data and to control the deflector actuator to adjust the deflector position based on the position data.

In an example method of operating a cold planer, the method includes receiving an input to perform a milling operation. Upon receiving an input, the method includes sending an instruction to a milling drum driver to rotate a milling drum that is rotatably coupled to a machine frame. The milling drum is configured to produce milled material and deliver it to a first conveyor. A second conveyor is pivotably coupled to the machine frame and is configured to receive, from the first conveyor, at least a portion of the milled material. To control the position of the second conveyor, the method includes generating, with a swivel sensor, swivel data corresponding to a swivel position of the second conveyor relative to the machine frame. The method further includes receiving the swivel data and determining, based on the swivel data, that the swivel position of the second conveyor should be adjusted. To adjust the position of the second conveyor, the method includes sending an instruction to a swivel actuator coupled to and extending between the machine frame and the second conveyor to adjust the swivel position of the second conveyor.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

A cold planer may be defined as a machine used to remove layers of hardened asphalt from an existing roadway. It is contemplated that the disclosed cold planer may also or alternatively be used to remove cement and other roadway surfaces. Although the type of machine illustrated in the examples is a cold planer, the machine may be any other type that includes a conveyor system. The cold planer is shown primarily for illustrative purposes to disclose features of various examples.

In this disclosure, relative terms, such as, for example, "about" is used to indicate a possible variation of ±10% in a stated numeric value.

Figure 1:
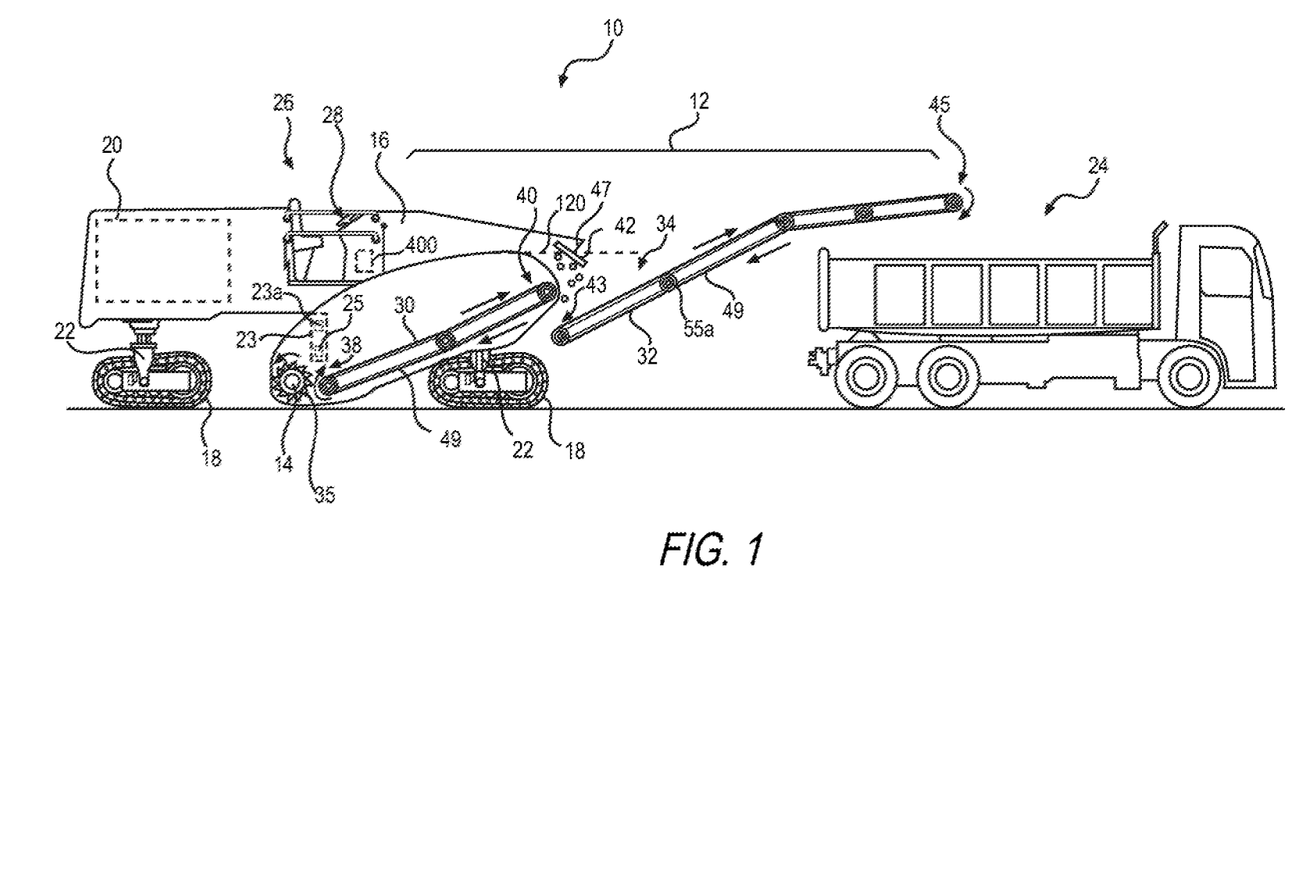
FIG. 1 is a partial view of a cold planer having a conveyor system, in accordance with at least one example.

FIG. 1 shows an example of a machine, such as cold planer 10 including a conveyor system 12 (e.g., material transfer system) associated with a milling drum 14. The cold planer 10 may include a machine frame 16 (hereinafter, frame 16) supported by one or more traction devices 18, and a frame-mounted engine 20 configured to drive the conveyor system 12, milling drum 14, and traction devices 18. Traction devices 18 may include either wheels or tracks connected to lifting columns 22 that are adapted to controllably raise and lower the frame 16 (and the milling drum 14) relative to a ground surface. The conveyor system 12 may be connected at a leading end to frame 16 and may be configured to transport material away from the milling drum 14 and to be discharged at a waiting haul vehicle 24.

Frame 16 may also support an operator station 26 having one or more input devices 28 in communication with a control module 402 (FIG. 4) to control the cold planer 10 during operation. For example, using the input devices 28, the operator may control the operations of, among others, the conveyor system 12 (such as, for example, the speed, direction, swivel, etc.), the milling drum 14 (such as, for example, milling speed, depth of cut, etc.), and one or more material deflectors 42. Conveyor system 12 may include various components that cooperate to transfer broken up (or milled) asphalt from the milling drum 14 to the waiting haul vehicle 24. Some operations of the conveyor system 12 can be automatically or semi-automatically controlled by the control module 402.

The conveyor system 12 may include a first conveyor 30, a second conveyor 32, and a transition region 34 located between the first conveyor 30 and the second conveyor 32. Each of the first and second conveyors 30, 32 may include a belt 49 that is driven to rotate about spaced apart rollers such as by a motor. The second conveyor 32 may discharge the milled asphalt into the haul vehicle 24 from a discharge end 45.

In some examples, the first conveyor 30 may be movable with respect to the frame 16. For example, a first conveyor actuator 23 can raise or lower a portion of the first conveyor 30 to pivot, raise or lower at least a portion of the first conveyor relative to the frame 16.

In some examples, the second conveyor 32 can swivel side-to-side and can move vertically to facilitate the discharge of the milled asphalt into haul vehicles of different sizes, as well as into a haul vehicle positioned, for example, laterally of the cold planer 10. The operator may adjust the swivel position, vertical position and motor speed, etc., of the conveyor system 12 components using the input devices 28 to regulate the flow of the milled asphalt to the haul vehicle 24.

The input devices 28 can be used by the operator to control the conveyor system 12, including the position and movement of the first and second conveyors 30, 32. The input devices 28 may be operably connected to various components and the control module 402 to operate the cold planer 10. In some examples, operably connected to can include electrical communication, hydraulic communication or electro-hydraulic communication, among others.

Cutting tools 35, connected to an outer periphery of the milling drum 14, may be configured to mill asphalt from the road surface and transfer the milled asphalt (hereinafter, milled material 110) onto the input end 38 of the first conveyor 30 as the milling drum 14 rotates. As shown in FIG. 1 and as is further described with reference to FIG. 2, the first conveyor 30 transports the milled material 110 from the input end 38 to a discharge end 40 positioned in the transition region 34. To prevent (or minimize) the milled material 110 from spilling over the sides of the first conveyor 30, in some examples, a housing 36 (shown in FIG. 2), attached to the frame 16, may cover at least a portion of the first conveyor 30. At the discharge end 40, the milled material 110 is transferred onto the input end 43 of the second conveyor 32 in the transition region 34.

Figure 2:
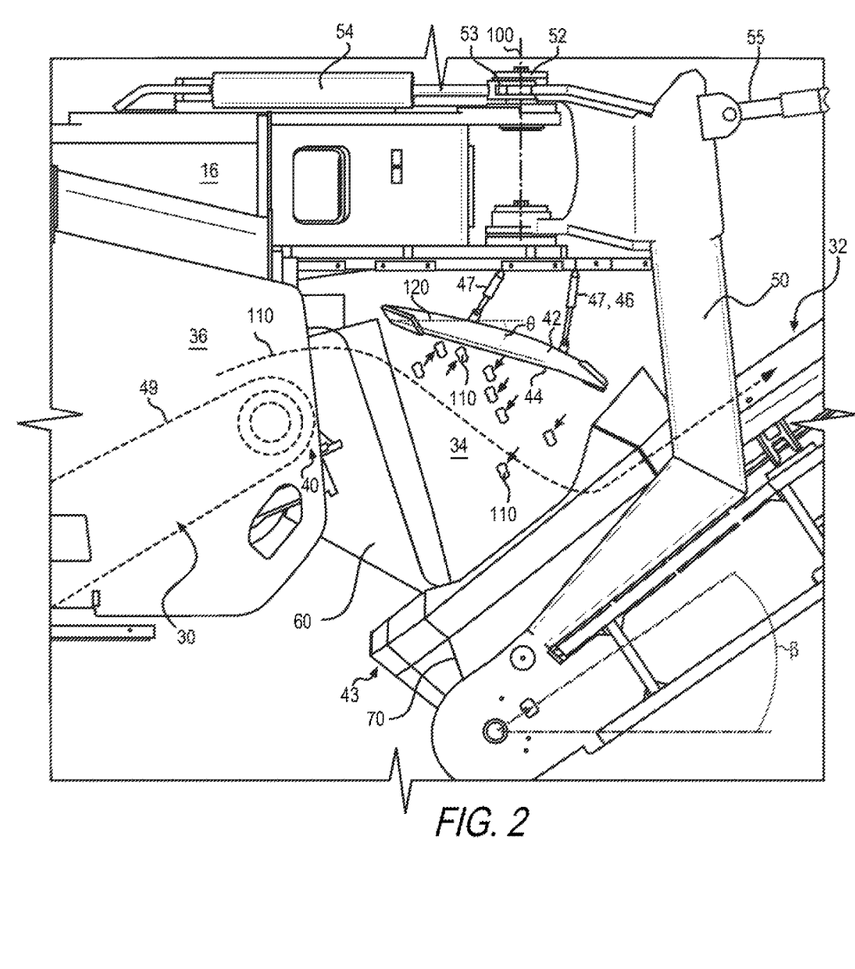
FIG. 2 is a close-up view of a portion of the cold planer of FIG. 1 including a material transfer region and second conveyor attachment region.

FIG. 2 shows a close-up view of a portion of the cold planer 10 of FIG. 1 including the material transfer region 34 (between the first and second conveyors 30, 32). FIG. 2 also shows second conveyor 32 attachment to the frame 16. As illustrated in FIG. 2, the discharge end 40 of the first conveyor 30 may include a scoop 60 shaped to funnel the milled material 110 from the first conveyor 30 to the input end 43 of the second conveyor 32. The input end 43 of the second conveyor 32 may include a hopper 70 configured to receive the volume of milled material 110 from the first conveyor 30 (e.g., without spilling over the sides), and channel it towards the discharge end 45 of the second conveyor 32 (FIG. 1).

As shown in FIGS. 1 and 2, in the transition region 34, the speed of the belt 49 may cause the milled asphalt to be ejected from the discharge end 40 of the first conveyor 30. To prevent the loss of milled material, a material deflector 42 (hereinafter, deflector 42) can be provided so that at least some of this ejected milled material 110 may contact (e.g., strike against) the deflector 42 to deflect the milled material 110 and redirect it towards the input end 43 of second conveyor 32.

The input end 43 of the second conveyor 32 may be supported on the frame 16 by a pivot arm 50 coupled to the frame 16 at a pivot 52. To swivel the second conveyor 32 from side to side, a swivel actuator 54, coupled to and extending between the frame 16 and the pivot arm 50, may be configured to rotate the pivot arm 50 about a vertical axis 100 at the pivot 52. For example, in response to operator commands (e.g., via input devices 28), the swivel actuator 54 may actuate to swivel (e.g., rotate) the second conveyor 32 (at pivot 52) about the vertical axis 100 and relative to the first conveyor 30 to discharge the milled asphalt into a haul vehicle 24 positioned by the side of the cold planer 10. In some examples, the vertical axis 100 may be defined vertical relative to the ground surface the cold planer 10 is positioned on. This swivel action can be particularly beneficial in accommodating a haul vehicle 24 that is not arranged in-line with the longitudinal axis 120 of the cold planer 10, but rather is located ahead of and laterally off to the side of the cold planar 10.

In some examples, the cold planer 10 can include a swivel position sensor 53 (hereinafter, swivel sensor 53) configured to sense a swivel position of the second conveyor 32. The swivel sensor 53 can generate swivel data corresponding to a swivel position of the second conveyor 32 (e.g., relative to the frame 16). In some examples, the swivel sensor 53 can be a rotary position sensor configured to determine the rotation of the second conveyor 32 relative to the frame 16 at pivot 52. In some examples a plurality of swivel actuators 54 and one or more swivel sensors 53 can be provided.

The swivel sensor 53 can generate swivel data corresponding to the swivel position of the second conveyor 32. The control module 402, in electrical communication with the swivel sensor 53 and the swivel actuator 54 (FIG. 4), can be configured to receive the swivel data and to provide instructions to the swivel actuator 54 to control motion of the second conveyor 32 based on the swivel data.

The swivel sensor 53 can be a rotary position sensor, however, in some examples, the swivel sensor 53 can be an extension sensor incorporated into, or coupled to, the swivel actuator 54. In such an example, the swivel data can be generated by an extension sensor (e.g., swivel sensor 53) located on the swivel actuator 54. In this example, the swivel sensor 53 can measure the extension position of the swivel actuator 54. The swivel sensor 53 can sense how far the swivel actuator 54 is extended (rather than sensing the actual rotary angle directly). The swivel data generated by the swivel sensor 53, can be extension position data. The extension position data (e.g., a type of swivel data) can be received by the control module 402 (FIG. 4) for use in controlling the motion of the second conveyor 32. In some examples, the extension position data can be used to calculate (e.g., estimate, extrapolate) the rotary position of the second conveyor 32. In some examples the extension position data generated by the swivel sensor 53 can be converted to rotary swivel position data by the control module 402 or another control device. Any type of sensor that can assess the location of the second conveyor can be used as the swivel sensor. Furthermore, the swivel sensor can be mounted, positioned, etc. at any location that can assess the position of the second conveyor.

In some examples, to change the vertical position of the second conveyor 32 discharge end 45 to reach a haul vehicle 24, a vertical pivot actuator 55 can be provided (shown in partial view in FIG. 2, with the other end attached to, for example, vertical pivot 55a in FIG. 1). For example, one end of the vertical pivot actuator 55 can be coupled to the frame 16, or an extension of the frame 16, such as the pivot arm 50 (FIG. 1). The other end of the vertical pivot actuator 55a can be coupled to the second conveyor 32 (such as at 55a in FIG. 1). Extension or retraction of the vertical pivot actuator 55 can cause lower or raising of the discharge end 45 of the second conveyor 32. This raising or lowering action can be particularly beneficial in accommodating haul vehicles 24 of different heights. As in the case of swivel position described herein, the vertical pivot position can also be monitored by a vertical pivot position sensor 25, such as a second extension sensor incorporated into, or coupled to, the vertical pivot actuator 55. Similar control features described with regard to the swivel action of the second conveyor 32, including sensors and stored inputs can also be implemented to control the vertical motion of the second conveyor 32.

As shown in FIGS. 1 and 2, to help direct the flow of milled material 110 exiting the discharge end 40 of the first conveyor 30, the deflector 42 (hereinafter, deflector 42) can be provided. An example of milled material 110 flow is depicted generally by flow line and particles 110. The deflector 42 can be arranged so that at least some of the milled material 110 ejected from the discharge end 40 of the first conveyor 30 may contact (e.g., strike against) the deflector 42 to deflect the milled material 110 and redirect it towards the input end 43 of second conveyor 32.

To help facilitate more controlled flow of the milled material 110, the deflector 42 may be attached to the frame 16 and have a deflecting surface 44 configured (shaped, angled, etc.) to deflect and redirect the milled material 110 exiting the first conveyor 30 towards the input end 43 of the second conveyor 32. As illustrated in FIG. 2, the deflecting surface 44 may be angled with respect to the vertical axis 100 and a horizontal or longitudinal axis 120 (e.g., horizontal relative to the ground surface the cold planer 10 is positioned on) to deflect the milled material 110 towards the input end 43.

When the speed and/or volume of the milled material 110 in the first conveyor 30 is relatively low, the milled material 110 exiting the scoop 60 may fall directly on the hopper 70 (e.g., by gravity). However, when the volume and/or the speed of the milled material 110 (in the first conveyor 30) increases, as illustrated in FIG. 2, some of the milled material 110 may be ejected (e.g., by inertial forces) from the first conveyor 30 towards the deflector 42. This ejected milled material 110 may impact, or strike against, the deflector 42 and get deflected downwards towards the scoop 60 or the input end 43 of the second conveyor 32. The deflector 42 may be shaped to deflect at least some of the milled material 110 (ejected from the first conveyor 30) that impacts the deflector 42, towards the input end 43 of the second conveyor 32.

In some examples, the deflector 42 may be fixed to the frame 16 such that the deflecting surface 44 is arranged at a fixed angle with respect to the longitudinal axis 120. In some examples, the deflector 42 may be fixed with respect to the first conveyor 30. And, in some examples, the deflector 42 may be fixed with respect to the second conveyor 32. That is, in such examples, the deflector 42 may move with the second conveyor 32 as its swivels about the pivot 52. In some such examples, the deflector 42 may be fixed with respect to the pivot arm 50.

When the swivel position and/or the vertical pivot position of the second conveyor 32, or a position of at least a portion of the first conveyor 30 are changed, in order to maintain optimal milled material 110 flow from the first conveyor 30 to the second conveyor 32, it can be beneficial to change the position of the deflector 42 accordingly. Therefore, in some examples, and as shown in FIG. 2, rather than the deflector 42 remaining fixed, a deflector positioning system may be provided to adjust the position of the deflector 42.

The deflector 42 may be coupled to the frame 16 by one or more deflector actuators (hereinafter, deflector actuators). The deflector actuators 47 may include features to facilitate attachment to the frame 16 (or other part of the cold planer 10), and to the deflector 42. In some examples, the deflector actuators 47 can be coupled to the frame 16 and/or to the deflector 42 by spherical connections (e.g., such as a ball-in-socket type joints having at least partially spherical nesting connections). Ball-in-socket type joints may be provided for more maneuverable control of the deflector 42 than two-dimensional pivot-type joints. This allows improved adjustability in three-dimensions as compared to a pivoting two-dimensional connection.

Figure 3:
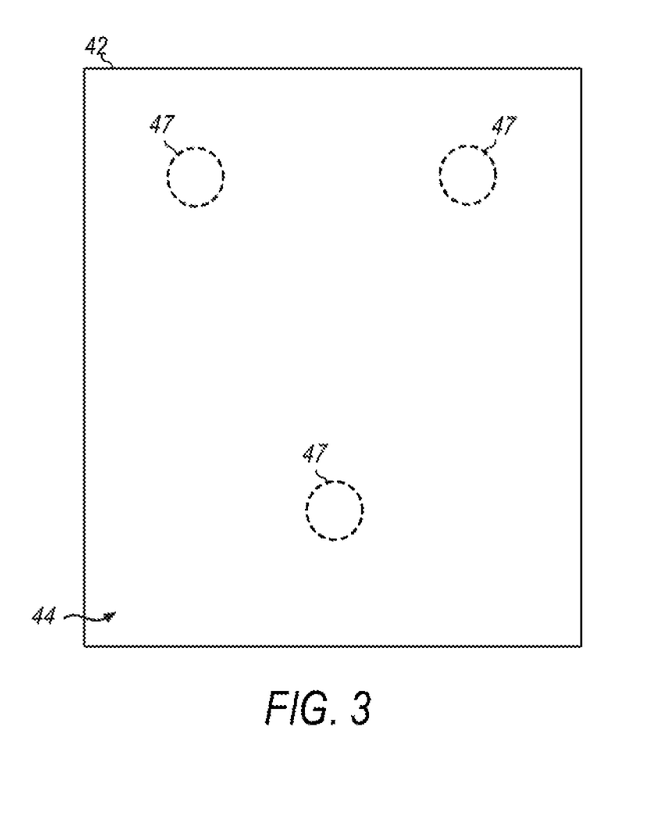
FIG. 3 is a top view of a material deflector of the cold planer of FIG. 1, in accordance with at least one example.

In some examples, and as shown in FIG. 2, and describe in further detail with respect to FIG. 3, three deflector actuators 47 can be provided. However, any number of deflector actuators 47 (1, 2, 4, 5 etc.) may connect the deflector 42 to the frame 16 or another part of the cold planer 10. In FIG. 2, two of the three deflector actuators 47 are in-line with each other such that it appears there are only two deflector actuators 47.

Figure 4:
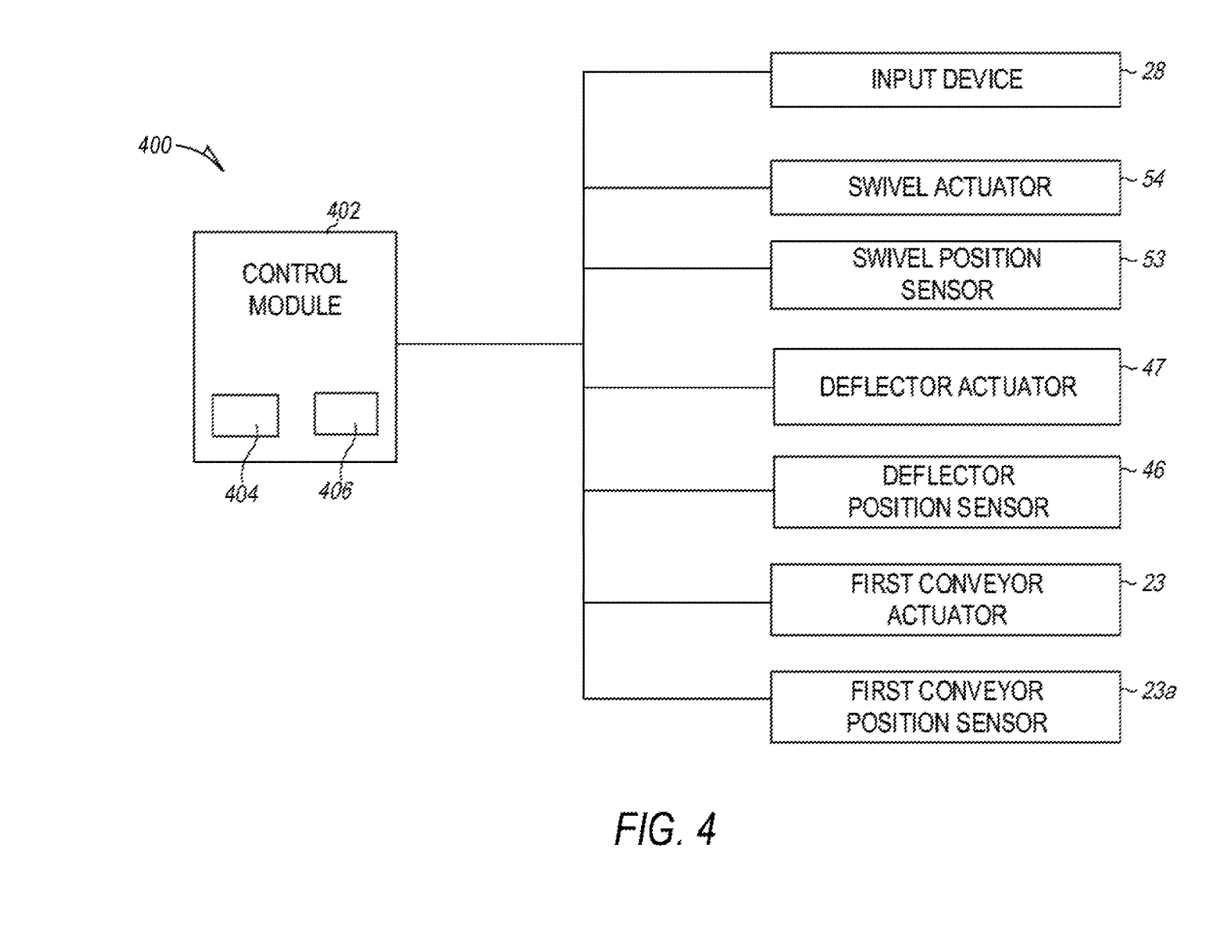
FIG. 4 is a diagram of a control system for operating the conveyor system of FIGS. 1-3, in accordance with at least one example.

To control the position of the deflector 42, the deflector positioning system can include at least one of the deflector actuators 47 having a deflector position sensor 46 (hereinafter, deflector sensor 46). The deflector sensor 46 can sense the position of the deflector 42 and, controlled by control module 402 (or another device) can be configured to generate deflector data corresponding to the deflector position. In an example deflector positioning system, one or more deflector sensors 46 can measure the extension of one or more of the deflector actuators 47 to determine the position of the deflector 42. The deflector positioning system can provide automatic position control of the deflector 42 via a control system 400, such as shown in FIG. 4. In other examples, an indication of optimal deflector 42 positioning can be provided to the operator at an interface (e.g., user input device 28), and the operator can manually move the deflector 42 using input device 28.

In some examples, the deflector 42 can be moved by the deflector positioning system to adjust the angle θ (FIG. 2). In some examples, the deflector 42 can be moved by the deflector positioning system along two, or even three axes to provide 3-dimensional adjustment of the deflector 42 position. In some examples, the deflector positioning system may be configured to adjust the deflector 42 position based on any position data or belt 49 speed data related to the first or second conveyors 30, 32 (FIGS. 1 and 2). The deflector positioning system can adjust the deflector 42 position to change the flow characteristics of the milled material 110 impacting the deflector 42.

As shown in the example of FIG. 3, three deflector actuators 47 can be positioned in a triangular arrangement to control the position of the deflector 42 in one, two or three dimensions. This can be useful to provide more customized milled material 110 deflection depending on the position of the first conveyor 30, the position of the second conveyor 32, and the belt 49 speeds. Since the first and second conveyors 30, 32 can be moved, changing the deflector 42 position can provide customized deflection and improved milled material 110 flow to better match the position of the first and second conveyors 30, 32.

In an example with more limited movement of the deflector 42, but a benefit of reduced cost, some of the deflector actuators 47 shown in FIG. 3 can be replaced with passive connection(s) having pivotable or ball-in-socket type connections to the frame 16 and deflector 42. In this example, the actuator(s) 47 that are provided still move the deflector 42, while the passive connection(s) play a passive role. In such an example, the deflector 42 is still movable, but the movement is not as customizable because the passive connections(s) don't create any movement, they just respond to the movement of the actuator(s) 47

As shown in FIG. 4, a control system 400 can include a control module 402 including processing circuitry 404 and a memory 406. The control module 402 can include the features and operate as shown and described with reference to FIGS. 1-3, and FIGS. 5-7. The control module 402 can control, among other things, the position of the second conveyor 32 and the position of the deflector 42. The control module 402 can also control the position or movement of other components, including, but not limited to, the first conveyor 30 and the belt 49 speeds.

Also shown in FIG. 4, the control module 402 can be in electrical connection (e.g. operable communication, electrical connection) with any one or more of the input device 28, the swivel actuator 54, the swivel sensor 53, the deflector actuator 47, the deflector sensor 46, the first conveyor actuator 23, and the first conveyor position sensor 23a, and other components, such as one or more belt (49) speed inputs, among others.

To improve the ease of use and performance of the cold planer 10, the control module 402 can be configured to receive user inputs and sensor inputs related to the conveyor system 12 to control the cold planer 10. In an example, FIG. 5 shows a top view diagram of the second conveyor 32 of the conveyor system 12 of FIGS. 1 and 2 rotated to different swivel positions under control of the control module 402.

For example, the control module 402 can receive a user input corresponding to an instruction to return the second conveyor 32 to a straight position. (straight position is shown as the solid line of FIG. 5). In the straight position, the second conveyor 32 may be arranged parallel (e.g., exactly, substantially, generally or about parallel) to the longitudinal axis 120 of the cold planer 10. When the control module 402 receives the instruction to return the second conveyor 32 to the straight position, the control module 402 can be configured to determine a current position of the second conveyor 32, and, if the second conveyor 32 is not arranged in the straight position (solid second conveyor 32 in FIG. 5), to actuate the swivel actuator 54 to pivot the second conveyor 32 to the straight position.

Figure 5:
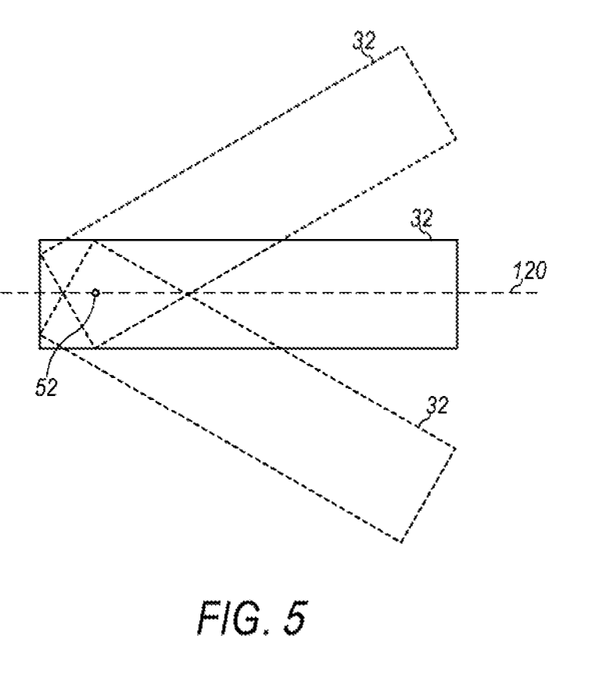
FIG. 5 is a top view diagram of a second conveyor of the conveyor system of FIG. 1 rotated to different swivel positions, in accordance with at least one example.

In some examples, in addition to the user being able to return the second conveyor 32 to a straight position (solid line of FIG. 5). A favorite swivel position can be saved and stored in a memory 406 accessible to the control module 402. For example, the user input can include a favorite swivel position input element (e.g., input device 28, FIG. 1) in electrical communication with the control module 402. When the favorite swivel position input element (e.g., 28) is actuated, the control module 402 determines a favorite swivel position based on the current swivel position data and stores the favorite swivel position in the memory 406 accessible to the control module 402. In other words, the favorite swivel position is saved corresponding to the position of the second conveyor 32 when the favorite swivel position input element is actuated. The memory 406 may be part of the control module 402, or operably coupled to the control module 402.

Other methods of storing the favorite swivel position may be provided, such as a pre-programed favorite position. A user can also enter a physical position into the input device 28 via a user interface, keyboard or touch screen by entering alphanumeric characters or by interacting with a visual depiction of the conveyor system 12 on a user interface of the input device 28 (FIG. 1).

During use, the second conveyor 32 may be swiveled into a range of positions. To return to the favorite swivel position (previously stored in the memory 406 accessible to the control module 402), the control module 402 receives the user input corresponding to the instruction to return the second conveyor 32 to the stored favorite swivel position. The control module 402 can determine a current position of the second conveyor 32 based on the swivel data, and, comparing the swivel data to the stored favorite swivel position data, determine if the second conveyor 32 is positioned in the favorite swivel position. If the control module 402 determines that the second conveyor 32 is not in the favorite swivel position, the control module 402 can actuate the swivel actuator 54 to pivot the second conveyor 32 from the current position to the stored favorite swivel position. The favorite swivel position can also include a favorite vertical pivot position, or any favorite setting related to a controllable feature of the conveyor system 12.

In conventional cold planers, because of the geometric arrangement of the pivot (e.g., 52), the swivel actuator (e.g., 54), and the second conveyor (e.g., 32), the second conveyor motion can be more difficult to control near the end of travel (e.g., furthest from straight position). This geometric arrangement can cause the second conveyor 32 to travel more quickly, and with less control as it nears the end of travel (e.g., end of travel position shown as the dotted line second conveyors 32 in FIG. 5).

To improve the ease of use of the conveyor system 12, in some examples, the second conveyor 32 swiveling action can be modified in certain ranges of motion. For example, the angular velocity and/or angular acceleration of the second conveyor 32 may be controlled differently when the second conveyor 32 is in certain positions or ranges of motion.

To counteract the problems with smoothly controlling existing cold planers, especially as the second conveyor 32 nears the end of travel point (usually just a hard, mechanical stop), the angular velocity of the second conveyor 32 can be sensed, monitored and adjusted. For example, when the control module 402 receives swivel data from the swivel sensor 53 indicating that the second conveyor 32 is within an end of travel range (e.g., has passed a threshold), the control module 402 can send an instruction to the swivel actuator 54 to reduce the rate of extension or contraction of the swivel actuator 54. When the rate of extension or contraction is reduced, the angular velocity of the second conveyor 32 is also reduced.

In the present example, the angular velocity is controlled near the end of travel ranges (e.g., end of travel position depicted as the dotted line second conveyors 32 in FIG. 5), however, in some examples, other ranges of travel could also be adjusted, such as when the second conveyor 32 nears the straight position (depicted as the solid line second conveyor 32 in FIG. 5).

In some examples, to control angular velocity of the second conveyor 32, the control module 402 can determine the swivel position of the second conveyor 32. When the swivel position is analyzed over time, it can be used to calculate, or can be an indicator of angular velocity. Based on the swivel data over time and the current swivel position, the control module 402 can determine that the angular velocity of the second conveyor 32 should be adjusted. If the control module 402 determines the angular velocity should be adjusted, the control module 402 can send an instruction to the swivel actuator 54 to change the rate of extension or contraction of the swivel actuator 54 to produce a change in the angular velocity of the second conveyor 32.

In addition to controlling the second conveyor 32, to further improve the milled material 110 flow (FIG. 2) along the conveyor system 12, the control module 402 can also be configured to control the deflector 42 position. The control system 402 can receive user inputs (e.g., 28) and/or sensor inputs (e.g., 53, 23a, etc.) related to the conveyor system 12, and determine an optimal position of the deflector 42. Proper positioning of the deflector 42 can improve the flow of the milled material 110 from the discharge end 40 of the first conveyor 30 to the input end 43 of the second conveyor 32.

In an example, the control module 402 can receive position data generated by a sensor associated with a first or second conveyor 30, 32 (e.g., swivel data or other). The position data associated with the first or second conveyor 30, 32 can be used as an indicator (e.g., can be used to deduce, estimate) the flow path of the milled material 110 at regions along the conveyor system 12, such as in a material transfer 34 region between the first conveyor 30 and second conveyor 32 (FIG. 2).

In some examples, the position data can include, but is not limited to, a first conveyor 30 position, such as height, angle or position of a portion of the first conveyor 30. In some examples, the first conveyor 30 position data can be related to the input end 38 or discharge end 40 position.

In some examples, the position data can alternatively or additively include a second conveyor 32 swivel position (FIG. 5), a second conveyor 32 vertical pivot position, such as angle β (FIG. 2), or a height of the second conveyor 32 input end 43 or discharge end 45. In some examples, deflector data obtained from the deflector sensor 46, along with one or more position data inputs from another position sensor described herein, and the speed of the first and second conveyor 30, 32 belts 49, can serve as an indicator of the path of milled material flow 110 from the first conveyor 30 to the second conveyor 32. Various embodiments including various combinations of the data described above are possible and can provide various degrees of certainty about the flow path of the milled material 110. These are merely provided as examples. In other examples, any combination of the described data and other position or movement data may be used to determine (e.g., estimate) the flow path of the milled material 110 to optimally adjust the deflector 42 position.

The control module 402 can receive deflector data from the deflector sensor 46 to determine the deflector 42 position, along with position data related to the milled material 110 flow (e.g., the position of the second conveyor 32 and/or the first conveyor 30) to determine if the deflector 42 position should be adjusted. If it is determined that the deflector 42 position should be adjusted, the control module 402 can send an instruction to one or more of the deflector actuators 47 to move the deflector 42 along one, two or three dimensions.

Figure 6:
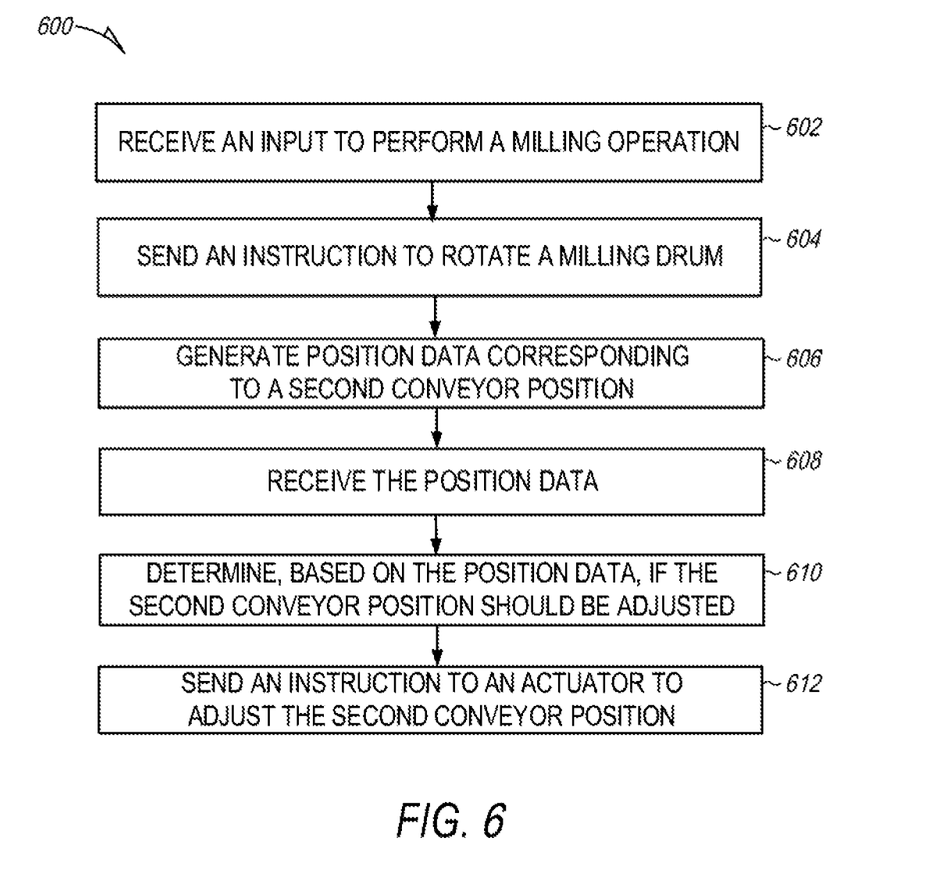
FIG. 6 is a method of operating the cold planer of FIGS. 1-3 using the control system of FIG. 4, in accordance with at least one example.
Figure 7:
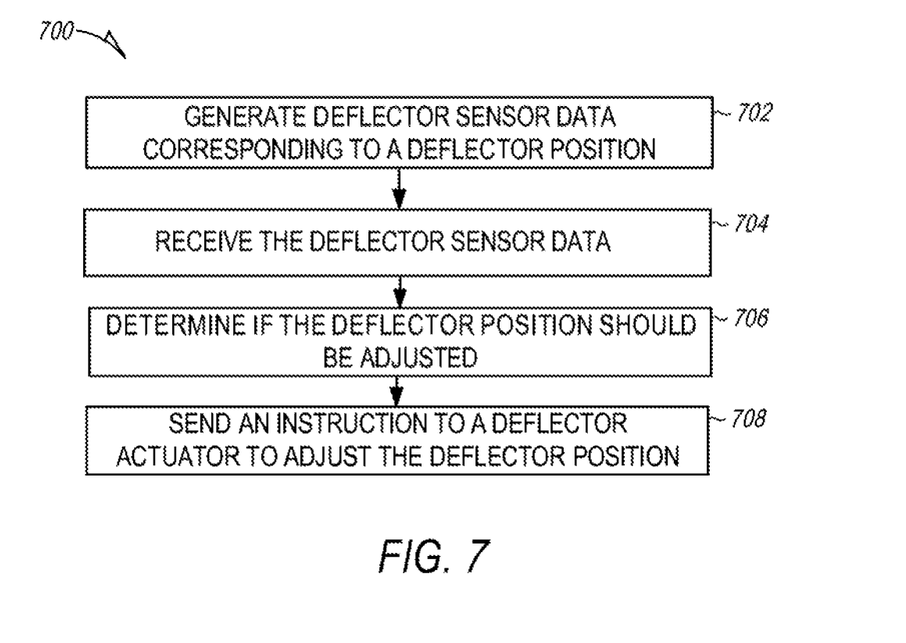
FIG. 7 is another method of operating the cold planer of FIGS. 1-3, using the control system of FIG. 4, in accordance with at least one example

FIGS. 6 and 7 show illustrative methods 600, 700 of operating a cold planer conveyor system, in accordance with at least some examples. The methods 600, 700 will be described with reference to the conveyor systems 12, the deflector 42 and the control system 400 of FIGS. 1-5. Portions of the method 600 and the method 700 may be used separately or together. For example, the second conveyor control aspects of method 600 can be used separately from, or together with the deflector control aspects of method 700.

The methods 600, 700 can be used with the cold planer 10 and conveyor systems 12 described herein, but can also be used with other machines and conveyor systems. Alternatively, the cold planer and conveyor systems described herein can also be used with other methods. In some examples, only portions of the conveyor systems or methods may be provided. For example, methods including aspects of the first conveyor, second conveyor and deflector can be used separately or together with one another.

The method 600, outlined in FIG. 6 and further described herein with respect to the conveyor systems of FIGS. 1-5, can include a method of operating a cold planer. In particular, the method 600 can include controlling the swivel position of a second conveyor.

Operation 602 of the method 600 can include receiving an input to perform a milling operation. In operation 602, a control module can receive the input to perform the milling operation from a user input. Performing a milling operation can include rotating a milling drum that is rotatably coupled to a frame to remove a layer of asphalt from a road and to transfer it (e.g., milled material) to a conveyor system including a first conveyor, a second conveyor, and in some examples a deflector.

Operation 604 can include sending an instruction to rotate the milling drum. The milling drum can receive power from and can be rotated by an engine, motor or other motive device that is operably coupled to the control module.

Operation 606 can include generating position data corresponding to a second conveyor position. For example, the position data can be generated by a position sensor such as a swivel position sensor (swivel sensor). The position data can correspond to a swivel position of the second conveyor relative to the frame. The second conveyor can be pivotably coupled to the frame and can be configured to receive, from the first conveyor, at least a portion of the milled material. Operation 608 can include the control module receiving the position data. Operation 610 can include the control module monitoring the position data and determining, based on the position data, if the second conveyor position should be adjusted. In operation 610, the control module can determine various adjustments to be performed, including but not limited to, the adjustments described with respect to FIGS. 1-5. Operation 612 can include sending an instruction to an actuator to adjust the second conveyor position. In operation 612, the control module can send various instructions, including but not limited to, the adjustment instructions described with reference to FIGS. 1-5.

FIG. 7 shows an example method 700 for operating a cold planer including controlling the position of a deflector to improve milled material flow along a conveyor system. The method 700 is further supported by the description of the conveyor systems in FIGS. 1-5. In method 700, to position the deflector for optimal milled material flow in a transition region between a first conveyor and a second conveyor, it is helpful to know the positions of the first and second conveyors (e.g., 30, 32, FIG. 1). Based on the position of the first conveyor and/or the second conveyor, the deflector can be adjusted to improve material flow.

As shown in FIG. 7, operation 702 of method 700 can include generating deflector sensor data corresponding to a deflector position. In an example, the deflector position can be sensed by a deflector sensor incorporated into a deflector actuator. Operation 704 can include a control module, in electrical communication with the deflector sensor and a deflector actuator, receiving the deflector sensor data. Operation 706 can include the control module analyzing the deflector sensor data and/or other position data, and determining if the deflector position should be adjusted to improve the flow of milled material. Other position data can include, for example, swivel data related to the second conveyor, or position data regarding the first conveyor. Operation 708 can include sending an instruction to a deflector actuator to adjust the deflector position. Upon receiving the instructions, the deflector actuator can be adjusted to improve the milled material flow from the first conveyor to the second conveyor.

The methods 600 and 700 can be implemented, for example, using control system 400 described herein. In an example, the control system 400 can include a machine readable medium to perform any of the steps of the methods 600 and/or 700. In an example, the term "machine readable medium" can include a single medium or multiple media (e.g., a centralized or distributed database, or associated caches and servers) configured to store one or more instructions. The instructions can be executed by a processor including process circuitry.

INDUSTRIAL APPLICABILITY

In general, the foregoing disclosure finds utility in various industrial applications, such as, in earthmoving, construction, industrial, agricultural, mining, transportation, and forestry machines. In particular, the disclosed conveyor system may be used on cold planer machines and other applications, such as, a quarry conveyor and the like. By applying the disclosed conveyor system to a cold planer, optimum material flow control and placement of the milled material into the desired discharge location may be achieved, while improving ease of use for the operator.

The disclosed deflector 42 may be used in any ground milling machine where controlled transportation of the milled material is important. The disclosed deflector 42 angled to deflect milled material ejected from the first conveyor towards a desired region of the second conveyor.

During operation of the cold planer 10, the milling drum 14 may break up and remove a portion of the ground surface and load the removed milled material on the conveyor system 12. This milled material is transported to a waiting haul vehicle 24 on the conveyor system 12. The conveyor system 12 includes a first conveyor 30 that transfers the milled material to a second conveyor 32 at a transition region 34. When the milled material exits the first conveyor 30, some of the milled material may strike, and get deflected by, the deflector 42 towards the input region of the second conveyor 32. The deflector 42 is positioned such that it deflects the milled material towards the second conveyor 32.

The use of a deflector 42 that is movable in three dimensions allows the position of the deflector 42 to be customized to deflect the milled material from the first conveyor towards the second conveyor. This can be accomplished by a control module operably coupled to a hydraulic system (or other control system) by monitoring, determining and adjusting the first conveyor 30, second conveyor 32 and deflector 42 positions.

What is claimed is:

1. A cold planer comprising:
   a machine frame;
   a milling drum rotatably coupled to the machine frame;
   a first conveyor configured to convey a milled material away from the milling drum;
   a second conveyor configured to convey the milled material from the first conveyor to a discharge location, wherein the second conveyor is pivotably connected to the machine frame;
   a swivel sensor configured to generate swivel data corresponding to a swivel position of the second conveyor; and
   a control module in electrical communication with the swivel sensor, the control module configured to receive the swivel data and to control motion of the second conveyor based on the swivel data.

2. The cold planer of claim 1, wherein the swivel sensor is a rotary position sensor that senses the swivel position of the second conveyor relative to the machine frame.

3. The cold planer of claim 1, further comprising a swivel actuator coupled to and extending between the machine frame and the second conveyor,
   wherein the swivel sensor is configured to generate the swivel data corresponding to an extension position of the swivel actuator, and
   wherein the control module can determine the swivel position of the second conveyor that corresponds to the extension position of the swivel actuator.

4. The cold planer of claim 1, further comprising a swivel actuator coupled to and extending from the machine frame to the second conveyor, the swivel actuator in electrical communication with the control module,
   wherein the control module is configured to control a swivel motion of the second conveyor by actuating the swivel actuator,
   wherein when the control module receives a user input corresponding to an instruction to return the second conveyor to a straight position, the control module is configured to actuate the swivel actuator to pivot the second conveyor to the straight position, wherein the straight position is substantially parallel to a longitudinal axis of the machine frame.

5. The cold planer of claim 1, wherein the control module is configured to control a swivel motion of the second conveyor by actuating a swivel actuator coupled to and extending from the machine frame to the second conveyor, wherein when the control module receives a user input corresponding to an instruction to return the second conveyor to a stored favorite swivel position, the control module determines a current position of the of the second conveyor based on the swivel data and actuates the swivel actuator to pivot the second conveyor from the current position to the stored favorite swivel position, wherein the stored favorite swivel position is stored in a memory accessible to the control module.

6. The cold planer of claim 5, further comprising a user interface including a favorite swivel position input element in electrical communication with the control module, and when the favorite swivel position input element is actuated, the control module determines a favorite swivel position based on current swivel data and stores the favorite swivel position in a memory accessible to the control module, the favorite swivel position corresponding to a current position of the second conveyor.

7. The cold planer of claim 1, further comprising a swivel actuator coupled to and extending from the machine frame to the second conveyor, wherein the control module receives the swivel data and using the swivel data, determines swivel position and angular velocity of the second conveyor, wherein the control module sends instructions to the swivel actuator to adjust a rate of extension or contraction of the swivel actuator based on the swivel position and angular velocity.

8. The cold planer of claim 7, wherein when the control module receives the swivel data and the swivel data indicates that the second conveyor is within an end of travel range, the control module sends an instruction to the swivel actuator to reduce the rate of extension or contraction.

9. The cold planer of claim 1, further comprising a deflector configured to deflect the milled material exiting the first conveyor towards the second conveyor.

10. The cold planer of claim 9, further comprising a deflector positioning system coupled to the deflector to adjust a deflector position, the deflector positioning system including a deflector actuator and a deflector sensor in electrical communication with the control module, wherein the deflector positioning system is configured to adjust the deflector position by actuating the deflector actuator.

11. The cold planer of claim 10, wherein the deflector positioning system is configured to adjust the deflector position based on the swivel data.

12. The cold planer of claim 11, wherein the deflector sensor generates deflector data, and wherein the control module determines an adjustment to the deflector actuator based on the swivel data and the deflector data.

13. A cold planer comprising:
a machine frame;
a milling drum rotatably coupled to the machine frame;
a first conveyor configured to convey a milled material away from the milling drum;
a second conveyor configured to convey the milled material from the first conveyor to a discharge location, wherein the second conveyor is pivotably connected to the machine frame by a swivel actuator;
a plurality of position sensors configured to generate position data that is an indicator of a flow path of the milled material;
a deflector including a deflector surface configured to deflect at least a portion of the milled material exiting the first conveyor towards an input end of the second conveyor, wherein the deflector is movably coupled to the machine frame by a deflector actuator;
a control module in electrical communication with the position sensor and the deflector actuator, the control module configured to receive the position data and to control the deflector actuator to adjust a deflector position based on the position data.

14. The cold planer of claim 13, further comprising:
a deflector sensor in electrical communication with the control module,
wherein the deflector sensor is configured to generate deflector data corresponding to the deflector position, and
wherein the control module is configured to determine an adjustment to the deflector position based on the deflector data, and to adjust the deflector position by actuating the deflector actuator.

15. The cold planer of claim 13, further comprising a plurality of deflector actuators in electrical communication with the control module, the plurality of deflector actuators arranged to provide three-dimensional adjustment of the deflector surface relative to the machine frame.

16. The cold planer of claim 15, wherein the plurality of position sensors are configured to generate position data corresponding to a position of at least one of the first conveyor and the second conveyor.

17. The cold planer of claim 15, wherein at least one of the plurality of deflector actuators is coupled to the machine frame by a mount including a partially spherical end in a socket.

18. A method of operating a cold planer, the method comprising:
receiving an input to perform a milling operation;
sending an instruction to a milling drum driver to rotate a milling drum that is rotatably coupled to a machine frame and configured to produce milled material;
generating, with a swivel sensor, swivel data corresponding to a swivel position of a second conveyor relative to the machine frame, wherein the second conveyor is pivotably coupled to the machine frame and the second conveyor is configured to receive, from a first conveyor, at least a portion of the milled material;
receiving the swivel data;
determining, based on the swivel data, that the swivel position of the second conveyor should be adjusted; and
sending an instruction to a swivel actuator coupled to and extending between the machine frame and the second conveyor to adjust the swivel position of the second conveyor.

19. The method of claim 18, further comprising:
determining the swivel position of the second conveyor based on the swivel data;
determining, based on the swivel position, to change an angular velocity of the second conveyor; and
sending the instruction to the swivel actuator, wherein the instruction includes an instruction configured to change the angular velocity of the second conveyor.

20. The method of claim 18, further comprising:
deflecting, with a deflector, at least a portion of the milled material exiting the first conveyor towards the second conveyor;
generating with a deflector sensor, deflector sensor data corresponding to a deflector position;

receiving the deflector sensor data;
determining that a deflector actuator should be adjusted based on the deflector position and at least one of a first conveyor position, a second conveyor position and the swivel data; and
sending an instruction to the deflector actuator to adjust the deflector position.

\* \* \* \* \*